United States Patent
Witzmann et al.

(10) Patent No.: US 11,975,999 B2
(45) Date of Patent: May 7, 2024

(54) METHOD FOR FURTHER PROCESSING OF A GLASS TUBE SEMI-FINISHED PRODUCT INCLUDING THERMAL FORMING

(71) Applicant: SCHOTT AG, Mainz (DE)

(72) Inventors: André Witzmann, Waldershof (DE); Andreas Wirth, Bühler (CH); Ulla Trinks, Mitterteich (DE)

(73) Assignee: SCHOTT AG, Mainz (DE)

( * ) Notice: Subject to any disclaimer, the term of this patent is extended or adjusted under 35 U.S.C. 154(b) by 1504 days.

(21) Appl. No.: 15/835,622

(22) Filed: Dec. 8, 2017

(65) Prior Publication Data

US 2018/0162765 A1 Jun. 14, 2018

(30) Foreign Application Priority Data

Dec. 8, 2016 (DE) .......................... 102016123865.1

(51) Int. Cl.
*C03B 37/07* (2006.01)
*B44C 1/22* (2006.01)
(Continued)

(52) U.S. Cl.
CPC .............. *C03B 37/07* (2013.01); *B44C 1/228* (2013.01); *B65C 3/02* (2013.01); *C03B 5/245* (2013.01);
(Continued)

(58) Field of Classification Search
None
See application file for complete search history.

(56) References Cited

U.S. PATENT DOCUMENTS 2,199,332 A * 4/1940 Dichter ................ C03B 23/112
65/108
2,378,146 A 6/1945 Luertzing
(Continued)

FOREIGN PATENT DOCUMENTS

CN 102077214 5/2011
CN 105271655 1/2016
(Continued)

OTHER PUBLICATIONS

"Glassblowing (Wikipedia)", Internet Citation, Feb. 8, 2011 (Feb. 8, 2011), pp. 1-8, http://en.wikipedia.org/w/index.php?oldid=412663373 [downloaded on Sep. 12, 2011].

*Primary Examiner* — Jodi C Franklin
(74) *Attorney, Agent, or Firm* — Ruggiero McAllister & McMahon LLC

(57) ABSTRACT

A method for further processing of a glass tube semi-finished product includes: providing the glass tube semi-finished product, along with tube-specific data for the glass tube semi-finished product; reading the tube-specific data for the glass tube semi-finished product; and further processing of the glass tube semi-finished product including a step of thermal forming carried out at least in sections. At least one process parameter during the further processing of the glass tube semi-finished product including the step of thermal forming carried out at least in sections is controlled as a function of the tube-specific data for the glass tube semi-finished product. In this way, the further processing can be matched more efficiently to the particular characteristics of a glass tube semi-finished product to be processed or a particular subsection thereof, and the relevant characteristics of the particular glass tube semi-finished product do not need to be measured again.

18 Claims, 6 Drawing Sheets

(51) Int. Cl.
  *B65C 3/02* (2006.01)
  *C03B 5/24* (2006.01)
  *C03B 11/12* (2006.01)
  *C03B 23/04* (2006.01)
  *C03B 23/18* (2006.01)
  *G06K 19/06* (2006.01)
  *A61J 1/00* (2023.01)
  *B65C 9/00* (2006.01)

(52) U.S. Cl.
  CPC .......... *C03B 11/122* (2013.01); *C03B 11/125* (2013.01); *C03B 23/04* (2013.01); *C03B 23/18* (2013.01); *G06K 19/06037* (2013.01); *G06K 19/06046* (2013.01); *A61J 1/00* (2013.01); *B65C 2009/0003* (2013.01); *C03B 2207/60* (2013.01); *C03B 2207/70* (2013.01); *C03B 2215/03* (2013.01); *C03B 2215/404* (2013.01)

(56) References Cited

U.S. PATENT DOCUMENTS

| | | | | |
|---|---|---|---|---|
| 2,595,077 | A * | 4/1952 | Hughes | C03B 23/07 65/105 |
| 2,790,994 | A * | 5/1957 | Cardot | C03B 9/28 264/525 |
| 2,935,819 | A * | 5/1960 | Dichter | C03B 23/07 65/227 |
| 3,215,517 | A * | 11/1965 | Zimmermann | C03B 23/097 65/113 |
| 3,368,588 | A * | 2/1968 | Meyer | C03B 23/097 138/178 |
| 3,394,263 | A | 7/1968 | Baker | |
| 3,401,028 | A * | 9/1968 | Morrill, Jr. | C03B 17/04 65/161 |
| 3,462,255 | A * | 8/1969 | Couquelet | C03B 23/112 65/158 |
| 3,549,524 | A * | 12/1970 | Wolfgang | B01J 20/3204 210/656 |
| 3,565,536 | A | 2/1971 | Wuellner et al. | |
| 3,777,171 | A | 12/1973 | Hollenbeck | |
| 3,880,637 | A | 4/1975 | Dichter | |
| 4,044,936 | A * | 8/1977 | Obersby | C03B 33/0955 225/2 |
| 4,052,184 | A * | 10/1977 | Anderson | C03B 23/0026 65/102 |
| 4,136,779 | A | 1/1979 | Bieringer | |
| 4,378,494 | A | 3/1983 | Miller | |
| 4,378,989 | A * | 4/1983 | La Fiandra | B23B 1/00 65/271 |
| 4,483,615 | A | 11/1984 | Bieringer et al. | |
| 4,487,322 | A | 12/1984 | Juvinall | |
| 4,720,192 | A | 1/1988 | Willison | |
| 4,731,254 | A * | 3/1988 | Heineken | C03B 29/02 219/121.64 |
| 4,748,307 | A * | 5/1988 | Lamb | C03B 37/029 219/634 |
| 5,252,115 | A | 10/1993 | Mannl | |
| 5,331,174 | A | 7/1994 | Dassler et al. | |
| 5,611,834 | A * | 3/1997 | Walter | C03B 23/112 65/102 |
| 5,779,753 | A * | 7/1998 | Vetter | B23K 26/032 65/105 |
| 6,211,952 | B1 | 4/2001 | Weiland et al. | |
| 6,415,631 | B1 * | 7/2002 | Weston | A61M 5/30 65/68 |
| 6,595,029 | B1 * | 7/2003 | Dick | C03C 17/004 65/DIG. 9 |
| 6,633,377 | B1 | 10/2003 | Weiss et al. | |
| 6,638,440 | B1 | 10/2003 | Grimard | |
| 6,674,043 | B2 * | 1/2004 | Trinks | C03C 23/0025 219/121.69 |
| 8,003,915 | B2 * | 8/2011 | Agmon | B23K 26/702 219/121.69 |
| 8,196,807 | B2 * | 6/2012 | Grimard | G06K 9/00577 235/375 |
| 8,328,082 | B1 * | 12/2012 | Bochenko | G16H 20/17 235/375 |
| 8,522,575 | B2 * | 9/2013 | Wada | C03B 29/02 65/120 |
| 8,872,870 | B2 * | 10/2014 | Witzmann | G06K 1/126 347/224 |
| 9,378,445 | B2 | 6/2016 | Stuck et al. | |
| 9,514,131 | B1 * | 12/2016 | Bochenko | G16H 20/13 |
| 9,524,623 | B2 | 12/2016 | Vogel | |
| 9,701,564 | B2 | 7/2017 | Bookbinder et al. | |
| 9,844,951 | B2 | 12/2017 | Krief | |
| 10,327,987 | B1 * | 6/2019 | Bochenko | G16H 20/13 |
| 10,442,718 | B2 * | 10/2019 | Maennl | B65D 1/09 |
| 10,550,027 | B2 * | 2/2020 | Inoue | A61J 1/06 |
| 10,710,921 | B2 * | 7/2020 | Wada | A61J 1/06 |
| 10,899,659 | B2 * | 1/2021 | DeMartino | B65D 1/0207 |
| 11,028,002 | B2 * | 6/2021 | Frost | C03B 32/00 |
| 2003/0029849 | A1 * | 2/2003 | Trinks | B41M 5/262 219/121.69 |
| 2004/0129026 | A1 * | 7/2004 | Bartsch | C03B 23/11 65/86 |
| 2004/0239038 | A1 * | 12/2004 | Kramp | H01J 9/40 277/316 |
| 2005/0023337 | A1 | 2/2005 | Benischke | |
| 2005/0218126 | A1 | 10/2005 | Leyvraz | |
| 2006/0108346 | A1 | 5/2006 | Janhunen | |
| 2006/0112729 | A1 | 6/2006 | Sakoske | |
| 2006/0218972 | A1 * | 10/2006 | Brik | C03B 37/08 65/492 |
| 2006/0267250 | A1 | 11/2006 | Gerretz et al. | |
| 2009/0077805 | A1 * | 3/2009 | Bachrach | B23K 26/364 29/890.033 |
| 2009/0095803 | A1 | 4/2009 | Benischke | |
| 2009/0099000 | A1 * | 4/2009 | Kuwabara | C03B 23/099 501/53 |
| 2009/0120253 | A1 | 5/2009 | Benischke | |
| 2009/0159174 | A1 | 6/2009 | Grimard | |
| 2009/0159654 | A1 * | 6/2009 | Grimard | A61M 5/3129 235/375 |
| 2010/0089097 | A1 | 4/2010 | Brack et al. | |
| 2010/0255229 | A1 * | 10/2010 | Wada | F23D 14/38 428/34.4 |
| 2010/0319400 | A1 | 12/2010 | Geisel | |
| 2011/0119898 | A1 * | 5/2011 | Blanchet | C03B 33/02 29/527.1 |
| 2011/0218661 | A1 | 9/2011 | Van Well | |
| 2012/0060558 | A1 * | 3/2012 | Haselhorst | C03B 23/092 65/29.21 |
| 2013/0169732 | A1 * | 7/2013 | Witzmann | B41M 5/262 347/225 |
| 2014/0034544 | A1 * | 2/2014 | Chang | B65D 23/0814 206/524.3 |
| 2014/0358270 | A1 | 12/2014 | Sudo | |
| 2014/0373574 | A1 | 12/2014 | Moseler | |
| 2015/0064779 | A1 | 3/2015 | Schultz | |
| 2015/0114043 | A1 | 4/2015 | Risch | |
| 2015/0197443 | A1 | 7/2015 | Voelkl | |
| 2015/0235233 | A1 | 8/2015 | Dangmann | |
| 2015/0329232 | A1 * | 11/2015 | Brozell | B65D 41/0471 215/44 |
| 2016/0016841 | A1 | 1/2016 | Frost | |
| 2016/0046517 | A1 * | 2/2016 | Kass | C03C 3/095 65/87 |
| 2016/0074865 | A1 | 3/2016 | Rao | |
| 2016/0139062 | A1 | 5/2016 | Faraldi et al. | |
| 2016/0257593 | A1 * | 9/2016 | Nguyen | C03B 5/06 |
| 2016/0272527 | A1 | 9/2016 | Moseler | |
| 2017/0084050 | A1 | 3/2017 | Ma et al. | |
| 2017/0349474 | A1 | 12/2017 | Allen | |
| 2018/0162765 | A1 * | 6/2018 | Witzmann | G06K 19/06037 |
| 2018/0164226 | A1 * | 6/2018 | Witzmann | C03C 23/0025 |
| 2018/0168928 | A1 | 6/2018 | Witzmann et al. | |
| 2018/0170804 | A1 * | 6/2018 | Witzmann | C03B 23/04 |
| 2018/0237330 | A1 * | 8/2018 | Shinada | C03B 37/0142 |
| 2018/0346368 | A1 * | 12/2018 | Lisman | C03C 23/006 |
| 2019/0164269 | A1 | 5/2019 | Kläger et al. | |

(56) References Cited

U.S. PATENT DOCUMENTS

| | | | |
|---|---|---|---|
| 2020/0002212 A1 | 1/2020 | Maennl | |
| 2020/0083080 A1* | 3/2020 | Clark | H01L 21/0228 |
| 2020/0309725 A1* | 10/2020 | Madhiwala | G01N 33/569 |
| 2020/0405438 A1* | 12/2020 | Shelton, IV | A61B 17/072 |
| 2021/0098016 A1* | 4/2021 | Suzuki | G11B 5/00813 |

FOREIGN PATENT DOCUMENTS

| | | |
|---|---|---|
| DE | 3121138 | 3/1982 |
| DE | 4224282 | 1/1994 |
| DE | 19926878 | 12/1999 |
| DE | 10122335 | 7/2002 |
| DE | 10234002 | 2/2004 |
| DE | 10335247 | 2/2005 |
| EP | 0761377 | 3/1997 |
| EP | 2818454 | 12/2014 |
| GB | 2078621 | 1/1982 |
| JP | H04231333 | 8/1992 |
| JP | H06263465 | 9/1994 |
| JP | 2009-132572 | 6/2009 |
| JP | 2011-070214 | 4/2011 |
| JP | 2015535794 | 12/2015 |
| JP | 2016528144 | 9/2016 |
| WO | 9910238 | 3/1999 |
| WO | 2004000749 | 12/2003 |
| WO | 2008104688 | 9/2008 |
| WO | 2009116300 | 9/2009 |
| WO | 2009128893 | 10/2009 |
| WO | 2012028611 | 3/2012 |
| WO | 2012046136 | 4/2012 |

* cited by examiner

| Glass tube ID | Tube-specific data |
|---|---|
| ID - 1 |  30 |
| ID - 2 |  31 |
| ⋮ | ⋮ |

METHOD FOR FURTHER PROCESSING OF A GLASS TUBE SEMI-FINISHED PRODUCT INCLUDING THERMAL FORMING

CROSS-REFERENCE TO RELATED APPLICATIONS

The present application claims priority to German patent application no. 10 2016 123 865.1, "Method for further processing of a glass tube semi-finished product including thermal forming", filed on Dec. 8, 2017, the whole content of which is hereby incorporated by reference.

FIELD OF THE INVENTION

The present invention relates in general to the further processing of glass tubes into end products, in particular hollow glass products, and relates in particular to the further processing of glass tubes including thermal forming into end products or hollow glass products, in particular to closely toleranced end products, such as containers for storing pharmaceutical, medical or also cosmetic substances, for example vials, cartridges or syringe bodies.

BACKGROUND OF THE INVENTION

For the further processing of glass tubes, the process parameters of a further processing apparatus must be adjusted as well as possible to the characteristics of a respective glass tube in order to ensure optimum quality of the end products. This is difficult and expensive particularly in the production of closely toleranced end products.

To increase the quality of such end products, in a further processing company the relevant characteristics of glass tubes are determined according to the prior art by means of suitable measuring devices. Only then can the relevant process parameters be adjusted accordingly. This not only delays the further processing of glass tubes but also makes it laborious and expensive.

Various methods for marking and coding glass tube semi-finished products are known from the prior art. However, they are not used for coding characteristics of the glass tube semi-finished products in such a way that the relevant data are available directly to a further processing company and can be further used by it directly.

For marking or coding glass, methods are known from the prior art in which markings or the like are inscribed directly in the glass material. Such a method is disclosed, for example, in US 2003 0029849 A1, DE 102 34 002 A1 and WO 2012 028611 A1 of the applicant, the contents of which are expressly incorporated herewith by way of reference. In this case, the glass is acted upon in sections by a laser pulse to apply a marking on the surface. The marking is clearly visible and can be reliably read out, in particular by way of a lens effect exerted by the marking, it can be applied free of stress even during production at high temperatures and is therefore suitable for applying the marking even during the production of glass tube semi-finished products, i.e. during the actual tube shaping. A particular advantage of this method is that the marking can be applied at temperatures above the transformation temperature of the glass without the temperature of the glass tube strand having to be increased to such high temperatures again after the actual tube shaping. With the method, markings to combat product piracy but also trademarks, company logos or other product features can be applied to the glass tube strand.

Other methods for marking glass substrates are disclosed in WO 2004 000749 A1 and WO 2009 128893 A1.

DE 103 35 247 A1 discloses a method for pattern optimization of plate glass.

EP 2 818 454 A1 discloses a glass processing apparatus for the production of glass containers from a glass tube semi-finished product, including a thermal forming to form the bottom of the glass containers. A marking provided in the glass tube semi-finished product or directly on the glass tube semi-finished product and used to control a process parameter during further processing of the glass tube semi-finished product, including a thermal deformation, which is carried out at least in sections as a function of tube-specific data read from the at least one marking, is not disclosed.

BRIEF SUMMARY OF THE INVENTION

Accordingly, there is a need to provide an enhanced method for the further processing of glass tube semi-finished products including thermal forming thereof, with which it is possible to reliably produce end products made of glass in a simple and cost-effective manner, particularly hollow glass products, which in particular meet higher quality requirements, in particular are more closely toleranced.

According to a first aspect of the present invention, there is provided a method for further processing of a plurality of glass tube semi-finished products including: a step of thermal forming carried out at least in sections, comprising: providing the plurality of glass tube semi-finished products, wherein tube-specific data are provided for each glass tube semi-finished product; reading out the tube-specific data for a respective glass tube semi-finished product; and further processing the plurality of glass tube semi-finished products including a step of thermal forming carried out at least in sections; wherein at least one process parameter during further processing of the respective glass tube semi-finished product including the step of thermal forming carried out at least in sections is controlled as a function of the tube-specific data for the respective glass tube semi-finished product. According to the present invention, the respective glass tube semi-finished product is marked with at least one marking based on which the tube-specific data for the glass tube semi-finished product are read out.

Here, the at least one marking may be connected with the respective glass tube semi-finished product, e.g. as a marker tag or an RFID-tag, or may be applied directly on the glass tube semi-finished product (e.g. as an imprint, adhesive label, RFID-tag) or may be inscribed (e.g. as a marking inscribed into the glass material).

If, for example, the tube-specific data of a glass tube semi-finished product to be further processed indicate a relatively thin or thick wall thickness, then the process parameters can be varied accordingly during further processing such that, according to the invention, end products can be produced which have practically the same characteristics as during production from a glass tube semi-finished product having a normal wall thickness. The same applies to all relevant characteristics of an initial glass tube, including geometric, physical or physicochemical properties.

In the context of the present invention, the tube-specific data may basically be any characteristics of a glass tube semi-finished product which can have an influence on the characteristics of an end product and which can also be influenced by suitably setting process parameters during further processing of a glass tube semi-finished product. The process parameters during the further processing of a glass tube semi-finished product are, in particular, the process conditions when separating subsections of a glass tube semi-finished product, such as temperature, burner output, distance of the burner(s) from the glass tube semi-finished product, orientation or alignment of the respective burner, process times, process cycling or the like, or the process conditions during further processing of a subsection separated from the respective glass tube semi-finished product, such as temperature, burner output, distance of the burner(s) from a respective separated subsection, orientation or alignment of the respective burner, process times, process cycling, process parameters during thermal forming of the separated subsection, such as applying an over pressure or negative pressure, (in sections) pressing of the separated subsection into a mold or similar, thermal conditions during cooling, or similar.

In the simplest case, control of the process parameters may be setting of these process parameters according to a lookup table in which process parameters assigned to the relevant characteristics of a glass tube semi-finished product or (separated) subsection thereof are stored, with which end products having the desired characteristics can be produced. Such a lookup table may be stored, in particular, in a database or on a data carrier to which a control device, for example a processor, of a further processing apparatus has access. The data of such a lookup table may be based in the simplest case on empirical data but may also be the result of calculations or numerical simulations or of corresponding test series, that is to say knowledge-based. Based on the quality of end products actually achieved, feedback to the data of such a lookup table can be provided in principle so that even better quality can be achieved for end products in the future.

The control of these process parameters may, of course, also take place according to mathematical formulae or calculations which incorporate the tube-specific data provided.

In the context of the present invention, the "provision of the tube-specific data" means, in particular, that a further processing company does not have to laboriously determine or measure the relevant characteristics of a respective glass tube semi-finished product to be processed again but that the glass tube manufacturer makes these data available indirectly or directly to the further processing company according to the invention in an appropriate manner which helps to reduce effort and costs during the further processing of glass tubes. For this purpose, a corresponding access of the further processing company to data of the manufacturer of the glass tube can be provided, for example by access to a database operated by said manufacturer or on a data carrier made available by said manufacturer. Basically, the data may also be stored directly on the glass tube, for example in a suitable marking, an adhesive label, an RFID tag or similar. In each case, the further processing company can easily read in the relevant tube-specific data without them having to be laboriously measured or otherwise determined again.

According to a further embodiment, the tube-specific data are provided in each case for subsections of the glass tube semi-finished product of a predetermined length in a longitudinal direction of the glass tube semi-finished product, which can be accomplished in particular by a tube strand marking provided continuously or in sections on the glass tube semi-finished product. The length of these subsections may be matched in particular to the length of end products to be manufactured, including any waste possibly arising or similar. In other words: for each end product to be manufactured, exact tube-specific data are available for the further processing of the glass tube semi-finished product at the further processing company, based on which individually suitable process parameters can then be set or controlled for the further processing.

According to a further embodiment, the tube-specific data are provided for a particular glass tube semi-finished product averaged over a plurality of subsections of the glass tube semi-finished product in a longitudinal direction of the glass tube semi-finished product. The process parameters need not then be individually reset or controlled for each subsection of the glass tube semi-finished product. Rather, it is sufficient if the process parameters for the further processing of all subsections of a particular glass tube semi-finished product are set to the mean value determined in this way.

According to a further embodiment, the glass tube semi-finished product is provided, classified into one of a plurality of classes according to the averaged tube-specific data. It is advantageous that a plurality of glass tube semi-finished products of one and the same class can be further processed with the same process parameters which makes the further processing more effective, more time-saving, less expensive and more reliable.

According to a further embodiment, the aforementioned tube-specific data relate to geometric dimensions of the glass tube semi-finished product, in particular including at least one of the following measured variables for the glass tube semi-finished product: internal diameter; external diameter; wall thickness; radius of curvature; ovality of the internal diameter; ovality of the external diameter; a variation of at least one of the following measured variables: internal diameter; external diameter; wall thickness; radius of curvature; ovality of the internal diameter; ovality of the external diameter.

According to a further embodiment, the tube-specific data also comprise information on the quality of the glass tube semi-finished product, in particular at least one of the following items of information for the glass tube semi-finished product: composition of a glass melt which was used for tube shaping of the glass tube semi-finished product; homogeneity of the glass melt which was used for tube shaping of the glass tube semi-finished product; process parameters for producing and processing the glass melt which was used for tube shaping of the glass tube semi-finished product; inclusions in a wall of the glass tube semi-finished product, including bubbles, knots, crystalline regions and similar.

According to a further embodiment, the glass tube semi-finished product is identified with at least one marking, based on which or from which the tube-specific data for the glass tube semi-finished product can be read out (indirectly or directly). Thus, the at least one marking includes in particular tube identification information, based on which the tube-specific data for the glass tube semi-finished product can be read out of a data storage device or a database, in each case in association with a glass tube semi-finished product or a subsection thereof, which is identified by the respective tube identification information. Thus, provision of the tube-specific data takes place indirectly, namely via the data storage device, the database or similar, which can be easily and cost-effectively integrated into the processes of a further processing company.

However, the tube-specific data for the glass tube semi-finished product may also be included in further markings on the glass tube semi-finished product or in at least one further marking section of the at least one marking on the glass tube semi-finished product. Provision of the tube-specific data can thus take place directly, that is to say by means of the information written into the further marking or the further marking section about the respective glass tube semi-finished product or a respective subsection thereof.

According to a further embodiment, the at least one marking may be applied to the respective glass tube semi-finished product by means of one of the following methods: application, in particular imprinting, of a bar code, line marking or matrix code marking which codes the tube-specific data or a data link to them; sticking on an adhesive label which codes the tube-specific data or a data link to them; attachment of an RFID tag to the glass tube semi-finished product which codes the tube-specific data or a data link to them.

According to an alternative embodiment, the at least one marking may be produced by interaction of a laser beam with the glass of the glass tube semi-finished product. The laser inscription may basically be produced at temperatures below the transformation temperature. This applies particularly to inscriptions that are no longer present on the end product. In this case, the laser inscription does not need to meet the requirements, e.g. in respect of breaking strength, which are placed on the end product.

According to a further embodiment, the at least one marking may be generated in a wall of the glass tube semi-finished product by interaction of a laser beam with the glass of the glass tube semi-finished product at temperatures above the transformation temperature of the glass, in particular as a digital matrix code (DMC). It is advantageous that subsequently this information can practically no longer be falsified and that such markings can be read out in a simple and cost-effective manner, in particular optically and contact-free which can be easily integrated into the processes that are normally carried out at a further processing company.

According to a further embodiment, at least one glass tube semi-finished product is randomly measured and evaluated prior to further processing in order to carry out the method, in particular at the beginning in a further processing company, for example during an incoming goods inspection. The variables and evaluation data measured in this way are compared with the tube-specific data provided for the respective glass tube semi-finished product in order to determine variance information, wherein the at least one process parameter, which is used during further processing of a plurality of glass tube semi-finished products, including the step of thermal forming carried out at least in sections, is controlled or set as a function of the tube-specific data for the particular glass tube semi-finished products taking into account the variance information determined. In particular, by randomly measuring glass tubes, any systematic variances between the tube-specific data provided and the actual tube-specific data can thus be reliably determined and subsequently corrected. In this way, for example, systematic measuring errors or tube-specific data "embellished" by the manufacturer of the glass tube semi-finished product can easily be reliably corrected and prevented on the part of a further processing company.

According to a further embodiment, the further processing of the glass tube semi-finished product includes a local heating of a section of the glass tube semi-finished product and a separation of a container by separating a section from the glass tube semi-finished product in the region of the locally heated section to form a base of the container. In this case, the base may be formed in particular by collapsing and melting wall sections which are still sufficiently plastic which results in elongated end products or hollow glass products having at least one closed end. Based on the tube-specific data, it is possible in particular to control or suitably set process parameters which influence local heating of the section of the glass tube semi-finished product and separation of the container, in particular burner outputs and an axial adjustment of holding sections of a further processing plant that are used (even temporarily) to hold sections of the glass tube semi-finished product.

According to a further embodiment, a neck or narrowed neck section of the container is further preformed during separation of the container from the glass tube semi-finished product, the container being received upside down by a holding device and the bottom of the container is formed gradually from the glass tube semi-finished product by collapsing a wall of the glass tube.

According to a further embodiment, further processing of the base of the container is further provided, with at least one of the following steps: processing of the base of the container with at least one burner in order to roughly shape the base; further processing of the base with at least one burner in order to shape the base flat; pressing of the base into a mold die by applying a gas pressure, in particular in the range between 0.5 to 3.0 bar in order to finally shape the base; cooling of the base. Based on the tube-specific data, it is possible in particular to control or suitably set process parameters which relate to one or more of these further process steps.

According to a further embodiment, the further processing of the glass tube semi-finished product further comprises sorting or temporary storage of a glass tube semi-finished product if, based on the tube-specific data for the glass tube semi-finished product, it is determined that the further processing of the glass tube semi-finished product is not possible with current process parameters. In this way, in particular, classes of glass tube semi-finished products may be formed, each having the same or comparable relevant properties, in which case entire classes of such glass tube semi-finished products (or of separated and temporarily stored subsections thereof) can be formed and these classes may then be further processed with identical or substantially the same process parameters during further processing into the end product. It is advantageous that the relevant process parameters then do not have to be varied so often which enables further advantages during further processing. After temporary storage, a new class can then be further processed, in particular with once varied process parameters which are determined based on the tube-specific data for the glass tube semi-finished product.

According to a further embodiment, the end product after further processing is a container for receiving pharmaceutical, medicinal or cosmetic substances, in particular a vial, a cartridge or a syringe body. More generally, the end product is a hollow glass product of the aforementioned type which expediently has at least one opening for pouring in a substance.

According to a further embodiment, the container is marked with a marking for tracing and/or for a decision on an originality, in particular authenticity, or origin of the container. Based on such a marking, it is possible to guarantee a higher quality of end products by means of traceability within the scope of quality assurance. The marking, however, may also be used in addition to determine an originality, in particular authenticity, or origin of a container.

BRIEF DESCRIPTION OF THE DRAWINGS

The invention will be described in the following in an exemplary manner and with reference to the associated drawings, from which will ensue further features, advantages and objects to be achieved. The drawings show.

Identical reference numerals in the Figures indicate elements or groups of elements which are identical or having substantially the same effect.

DETAILED DESCRIPTION OF THE INVENTION

Figure 1A:
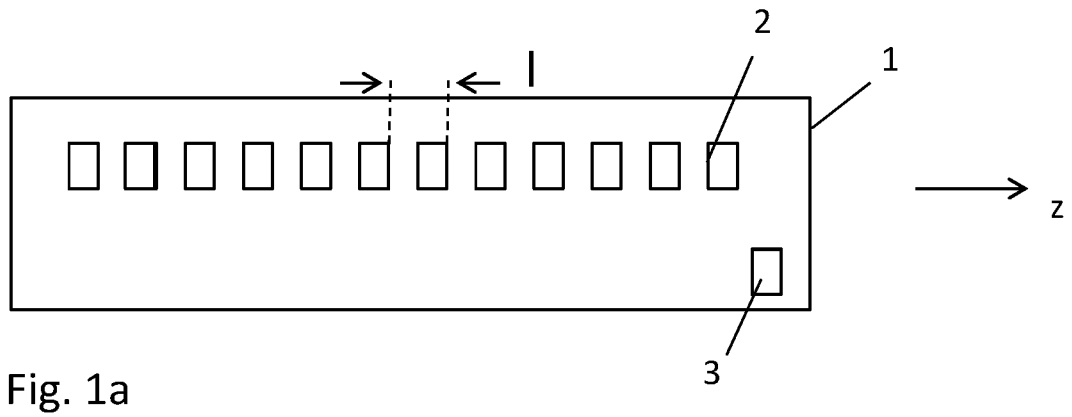
FIG. 1a a first embodiment of a glass tube semi-finished product according to the present invention with markings provided thereon which code tube-specific data.

FIG. 1a shows a first embodiment of a glass tube semi-finished product according to the present invention with markings provided thereon. In the context of the present invention, a glass tube semi-finished product is to be understood in particular as a prefabricated glass tube with predetermined dimensions and characteristics which serves as an initial workpiece for further processing into end products made of glass, in particular into hollow glass products. Such glass tube semi-finished products are usually supplied in predetermined lengths of, for example, 1.5 m, one tube end or preferably both tube ends being sealed on delivery to a further processing company in order to prevent undesirable ingress of contaminants into the interior of the glass tube semi-finished product. For this purpose, the at least one end of the glass tube semi-finished product 1 may also be completely sealed by thermal forming.

During the production of the glass tube semi-finished product 1, a tube strand marking 2 is applied continuously to the glass tube 1 which marking in each case includes tube-specific data for a particular subsection of a length 1 of the glass tube semi-finished product 1, as explained below. A second marking 3 is further provided separately from the tube strand marking 2 on the glass tube semi-finished product 1, said marking including tube identification information for identifying the glass tube semi-finished product 1, preferably a tube ID, tube serial number or similar. Furthermore, the second marking may also indicate details about the manufacturer, place of production and/or production plant of the glass tube 1. The tube strand marking may basically remain unchanged up to the end product (for example pharmaceutical container). The information about the glass tube semi-finished product 1 are preferably not in clear text in the markings 2, 3 but rather can only be read out according to a predetermined calculation or decoding instruction.

According to FIG. 1a, the tube strand markings 2 are applied on the glass tube 1 in the longitudinal direction (z) of the glass tube, preferably at predetermined, constant distances (1) from each other. These distances 1 may be matched, for example, to the expected lengths of the section from which the end products (for example pharmaceutical containers) are later to be produced and which for this purpose have to be cut to length from an original glass tube semi-finished product, including any waste and sections to be cut off.

Figure 1B:
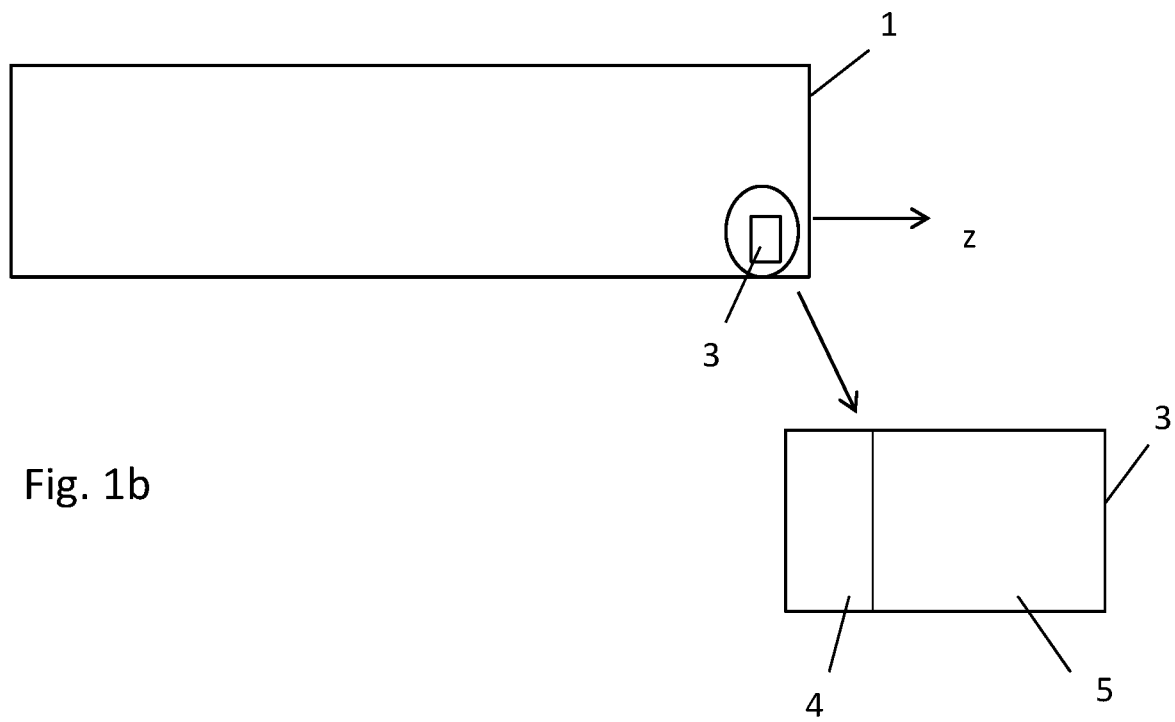
FIG. 1b a second embodiment of a glass tube semi-finished product according to the present invention with an enlarged representation of a marking provided thereon which codes tube-specific data.

FIG. 1b shows a second embodiment of a glass tube semi-finished product according to the present invention with an enlarged representation of a marking provided thereon. According to FIG. 1b, instead of the first and second markings applied spatially separately on the glass tube semi-finished product 1 at a predetermined location, for example on a front or rear end of the glass tube semi-finished product 1, a combination marking 3 is provided which includes at least one first and one second item of information 4, 5 which are preferably arranged in close proximity to each other. While the first information 4 includes tube identification information, the second information 5 codes tube-specific data for the particular glass tube semi-finished product 1 and also, if desired, for the individual subsections in the longitudinal direction of the glass tube semi-finished product 1 (cf. FIG. 1a), as explained below. Or the second information 5 codes a data link to these tube-specific data so that they can be read out indirectly, e.g. from a database by using this data link.

Figure 1C:
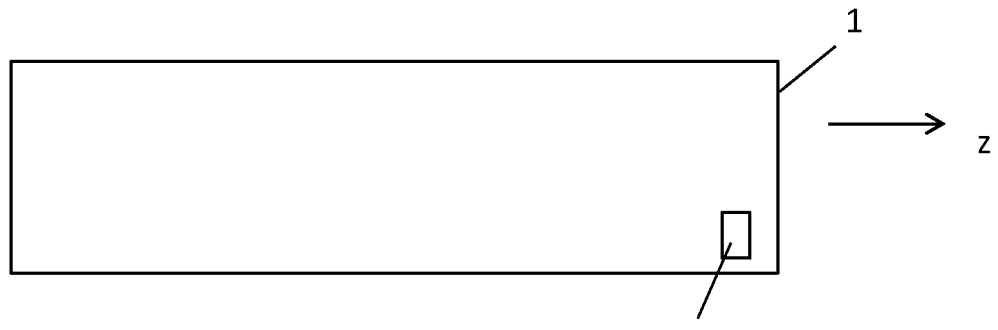
FIG. 1c a third embodiment of a glass tube semi-finished product according to the present invention with a marking provided thereon which indirectly codes tube-specific data.

FIG. 1c shows a third embodiment of a glass tube semi-finished product according to the present invention with a marking provided thereon which indirectly codes tube-specific data. For this purpose, the marking 4 codes tube identification information which uniquely identifies a glass tube semi-finished product 1, including all necessary details in order to carry out the method according to the invention, as explained below. For this purpose, it may be sufficient if the relevant tube-specific data can be indirectly read out from a database based on tube identification information coded in the marking 4 or based on a data link coded by the marking 4, as described in greater detail below with reference to FIG. 2b.

In the context of the present invention, the tube-specific data relate at least to geometric dimensions of the particular glass tube semi-finished product to be further processed, in particular at least one of the following variables for the glass tube semi-finished product which are measured for a particular glass tube semi-finished product: internal diameter; external diameter; wall thickness; radius of curvature; ovality of the internal diameter; ovality of the external diameter; a variation of at least one of the following measured variables: internal diameter; external diameter; wall thickness; radius of curvature; ovality of the internal diameter; ovality of the external diameter.

The tube-specific data may also comprise information on the quality of the glass tube semi-finished product and in particular include at least one of the following items of information for the glass tube semi-finished product: composition of a glass melt which was used for tube shaping of the glass tube semi-finished product; homogeneity of the glass melt which was used for tube shaping of the glass tube semi-finished product; process parameters for producing and processing the glass melt which was used for tube shaping of the glass tube semi-finished product; inclusions in a wall of the glass tube semi-finished product, including bubbles, knots, crystalline regions and similar.

In the context of the present invention, during further processing of the glass tube semi-finished product including a step of thermal forming carried out at least in sections, these tube-specific data are used to control at least one process parameter as a function of the tube-specific data for the relevant glass tube semi-finished product as described in greater detail below.

The method used for marking is also selected depending on the time of applying the markings 3-5. Thus, it may be sufficient if the markings 3-5 are applied at temperatures below a transformation temperature of the glass, for example by means of a laser marking, by imprinting a marking, for example a bar code or a line or matrix code marking, which codes the tube-specific data or a data link to them. The tube-specific data or a data link to them may also be coded in an adhesive label which is stuck onto the glass tube semi-finished product 1 in a suitable location and is removed again after reading out the relevant information before further processing of the glass tube semi-finished product 1. Or the tube-specific data or a data link to them may be coded in a radio frequency identification (RFID) tag which is provided on the glass tube semi-finished product 1 in a suitable location and is removed again after contact-free reading out of the relevant information by means of radio frequency (if) signals before further processing.

However, the markings 3-5 or parts thereof may also be produced at temperatures above the transformation temperature of the glass, preferably in the form of a digital matrix code (DMC) by means of a method as disclosed in US 2003 0029849 A1, DE 102 34 002 A1 and WO 2012 028611 A1 of the applicant, the content of which is expressly incorporated herewith by way of reference. The aforementioned data, in particular tube-specific data, can be applied in this case in clear text (unencrypted) or using a predetermined coding.

While the tube strand marking 2 may basically remain unchanged up to the end product or hollow glass product (for example pharmaceutical container), the aforementioned further markings are removed again during further processing of the glass tube semi-finished product 1 into the end product at a further processing company, a new marking being applied if necessary at the further processing company according to a predetermined calculation or coding specification and while retaining the information content of the other markings, said marking enabling traceability of the glass tube semi-finished product or a decision on the originality, in particular authenticity, or an origin of the end product.

Figure 2A:
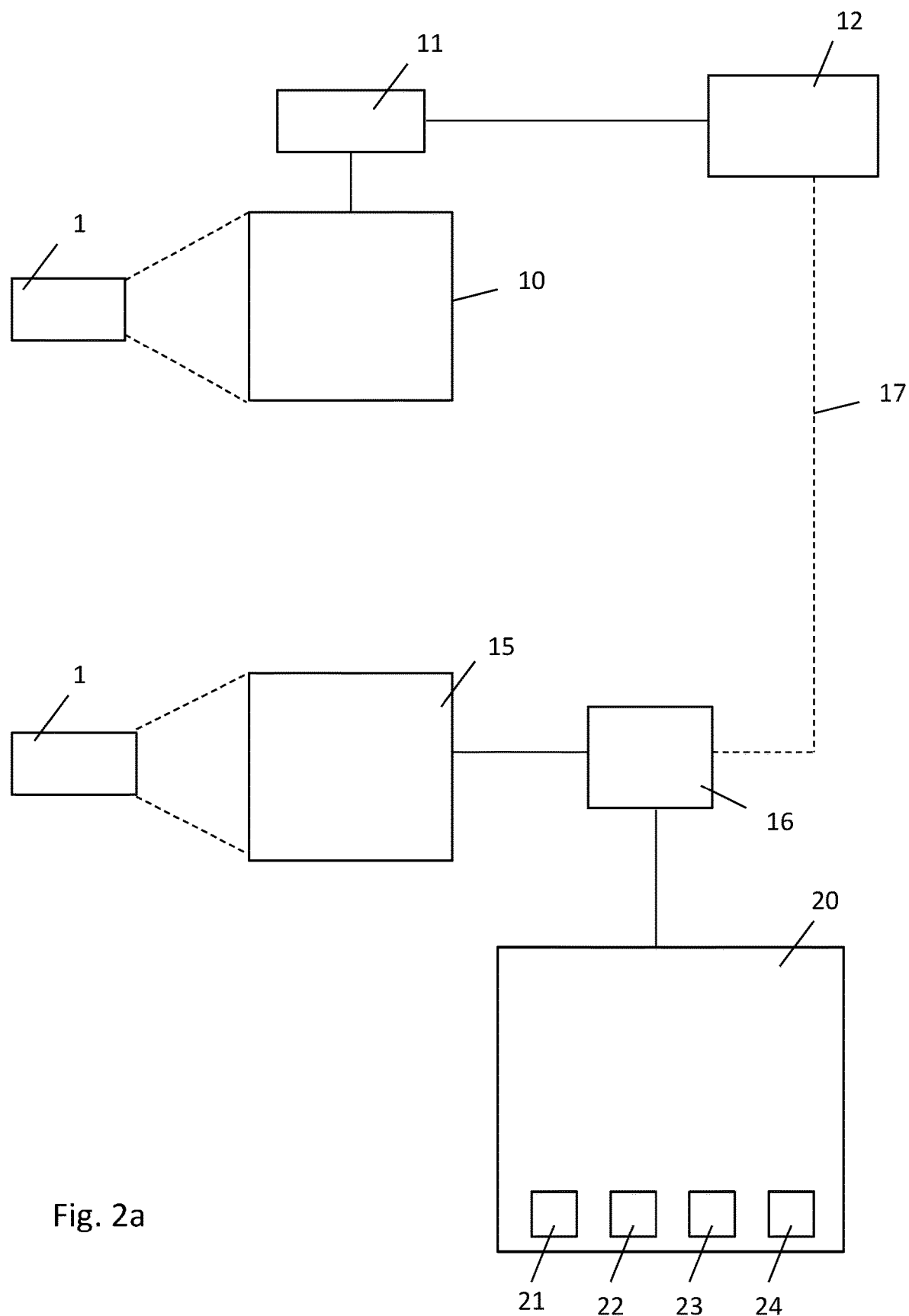
FIG. 2a in a schematic diagram, an apparatus for identifying a glass tube semi-finished product with tube-specific data and a plant for further processing a glass tube semi-finished product including a step of thermal forming thereof in order to implement a method according to the present invention.

FIG. 2a shows, in a schematic diagram, an apparatus for identifying a glass tube semi-finished product with tube-specific data and a plant for further processing a glass tube semi-finished product including a step of thermal forming thereof carried out at least in sections in order to implement a method according to the present invention. The upper part of the diagram in FIG. 2a illustrates an apparatus for applying a marking to the glass tube semi-finished product, including tube-specific data, a tube identification information and other information. It is assumed in this case that the marking is applied to the glass tube semi-finished product using a digital matrix code (DMC) and by means of a method as disclosed in US 2003 0029849 A1, DE 102 34 002 A1 and WO 2012 028611 A1 of the applicant. Here, tube-specific data, as explained above, are determined for the glass tube semi-finished product 1 by means of measuring device 10. In this case, the tube-specific data may also be determined for a plurality of subsections which are arranged at a distance from each other along a longitudinal direction of the glass tube semi-finished product, preferably at constant distances from each other, as shown in FIG. 1a. After detection of the tube-specific data, they are either stored in an external database 12 or they are stored, for example on a data carrier, such as a data CD. This always takes place in association with information which permits a one-to-one identification of the particular glass tube semi-finished product, in particular of a serial number of the glass tube semi-finished product or a tube identification information (hereafter also referred to as tube ID). In this way, the tube-specific data can be requested again indirectly and read out at a later time.

Alternatively or additionally, the tube-specific data or at least substantial portions thereof, which are suitable for determining suitable process parameters for subsequent further processing of the glass tube semi-finished product 1, may also be applied using a marking device, which may also be part of the measuring device 10, directly to the particular glass tube semi-finished product 1, for example by means of markings, as described above with reference to FIGS. 1a-1c. In particular, the marking with the tube-specific data may be applied to the glass tube semi-finished product using a digital matrix code (DMC) and by means of a method as disclosed in US 2003 0029849 A1, DE 102 34 002 A1 and WO 2012 028611 A1 of the applicant. However, the tube-specific data may also be applied to the glass tube semi-finished product in a different way, in particular by means of a so-called RFID tag.

According to FIG. 2a, measurement or determination of the tube-specific data and/or marking of the glass tube semi-finished product 1 takes place under the central control of a control device 11, which may also be connected to the database 12, in order to write data into it and/or read data out of it.

The lower part of the diagram in FIG. 2a shows schematically an apparatus 20 for further processing glass tube semi-finished products including a thermal forming carried out at least in sections. This apparatus is typically operated by a further processing company which purchases the glass tube semi-finished products 1 and further processes them into end products, in particular hollow glass products, in particular into glass containers, for example into glass containers for storing substances for pharmaceutical, medicinal or even cosmetic purposes. The apparatus 20 is controlled by a control device 16, in particular a processor, which is connected to a reading device 15 in order to read at least one marking from the glass tube semi-finished product 1, as described above with reference to FIGS. 1a-1c, based on which the tube-specific data for the particular glass tube semi-finished product 1 are read indirectly, for example from a database 12 (via the network 17, for example an in-house computer network or the network, in particular via a secure data communication connection) or from a data carrier. The reading device 15, however, may also read the tube-specific data for the particular glass tube semi-finished product 1 directly from the marking on the particular glass tube semi-finished product, for example by reading an optical marking on the particular glass tube semi-finished product 1 or by reading an RFID tag. The tube-specific data are made available to the device 20 via a joint control device 16.

The apparatus 20 for further processing of glass tube semi-finished products and for producing glass containers may in particular be an apparatus known from EP 2 818 454 A1 of the applicant, which comprises a parent machine and a downstream base machine, with a plurality of processing stations for executing processing steps, which are generally referred to as subunits 21-24 in FIG. 2a, the specific number of which is expressly not intended to be limited to only the four subunits 24-24 shown. To produce glass containers, a glass tube is first attached to a holding unit of the parent machine, said glass tube then being brought, due to rotation of the parent machine, into the various processing positions in order to be preprocessed. Thereafter, the glass tube is separated in a separation process and the resulting glass containers are transferred to a holding unit of the downstream base machine in order to be further processed there at various processing positions. At the processing positions of the base machine, for example, various steps are taken to properly shape the base of a glass container. Here, in particular by means of various hot shaping processes and rapid rotation of the resulting glass containers, a flat container base is produced which has a relatively low viscosity during the process because of the prevailing high temperatures.

For the production of glass vials, for example, a plurality of burners are arranged at the various processing positions of the downstream so-called base machine. Both the downstream base machine and the upstream parent machine consist of a rotor portion and a stator portion, wherein the rotor portions rotate once around their own axis during a production cycle. The processing positions of the base machine are used for shaping the base of the glass vials separated from the glass tube and include at least one separating step involving the actual separation of the vials from the glass tube, a first base shaping step, a second base shaping step, a third base shaping step, a die base shaping step, a base cooling step, a removal step and an idle step. In all these processing steps, the glass vials are held upside down. Specifically, in the above-described processing steps, the following processing operations are cycled one after the other:

In the separating step, the resulting glass vials, the neck of which is already formed, are initially picked up upside down by a holding device of the base machine in order to then be separated from the glass tube, the base forming gradually on separation of the glass vial from the glass tube and on collapse of the wall of said glass tube. In the first base shaping step, the bases of the glass vials are processed with at least one burner in order to roughly shape the bases of the glass vials. In the second base shaping step, the bases of the glass vials are further processed with at least one burner in order to shape the bases of the glass vials flat. In the third base shaping step, the bases of the glass vials are further processed with at least one burner in order to further refine the already shaped bases of the glass vials. In the die base shaping step, the bases of the glass vials are pressed into a mold die using a relatively high gas pressure (preferably 0.5 to 3.0 bar) to finally shape the bases. In the base cooling step, the bases of the glass vials are finally cooled down. In the removal step, the finished glass vials are removed from the base machine. In the idle step, the holding unit of the base machine is empty, and it is prepared in order to pick up another new glass vial in the next step.

In the manufacturing process described above, the bases of the glass vials are relatively plastic during most of the processing steps, i.e. they have a relatively low viscosity. In this case, the process parameters during separation of the glass vials from a glass tube semi-finished product but also during the further processing steps for base shaping on the downstream base machine are appropriately selected and adjusted to the characteristics of each processed glass tube semi-finished product or each currently processed subsection of the respective glass tube semi-finished product, as described in greater detail below with reference to FIGS. 3a and 3b, with the aim of forming glass containers with highly homogeneous characteristics which always comply with the relatively tight tolerances required but which are also distinguished by further advantageous physical or physico-chemical properties, in particular by a high chemical resistance, low ion emission, especially of alkali ions, in the substance to be stored in the glass container and a low delamination tendency. In this case, the so-called delamination is usually due to the fact that, due to the very high temperatures prevailing in the region of the glass container base, alkali borates, sodium and the like evaporate out of the hot glass which immediately re-deposit on cooler regions of the glass containers, in particular in an annular zone at a certain distance from the glass container base. This phenomenon, known as the delamination tendency, makes it difficult to ensure a constant, optimum quality of the glass containers. In the hot region, the stoichiometric composition of the glass in particular is changed. As a result of the subsequent cooling of the glass container, this results in a phase separation of the surface layer which may have a further adverse effect on the chemical resistance of the glass container. Due to the customary partially uncontrolled conditions during the hot forming processes, this leads to further irregularities in the manufacture of the glass containers.

For further processing of the respective glass tube semi-finished product, suitable process parameters are set at the plurality of subunits 21-24 of the device 20, for example process temperatures and/or process times and/or process cycles and/or process pressures and/or heating outputs of burners and/or rotational speeds for rotating the glass tube semi-finished product during further processing or similar. According to the invention, these process parameters are appropriately set during further processing of the glass tube semi-finished product, including the step of thermal forming carried out at least in sections, as a function of the tube-specific data determined for the respective glass tube semi-finished product 1. The control of these process parameters as a function of the respective tube-specific data takes place by means of the control device 16 which has access to the tube-specific data for this purpose, for example by accessing the database 12 which stores these tube-specific data.

Figure 2B:
FIG. 2b a database which stores tube-specific data for a plurality of glass tube semi-finished products.
Figure 2B:

As shown in FIG. 2b, the tube-specific data 30, 31 may be stored in the database, for example in the form of a lookup table in association with particular tube identification information tube ID 1, tube ID 2, etc.

Two embodiments of a method according to the present invention for further processing a glass tube semi-finished product into an end product, for example a glass container, are described below with reference to FIGS. 3a and 3b.

Figure 3A:
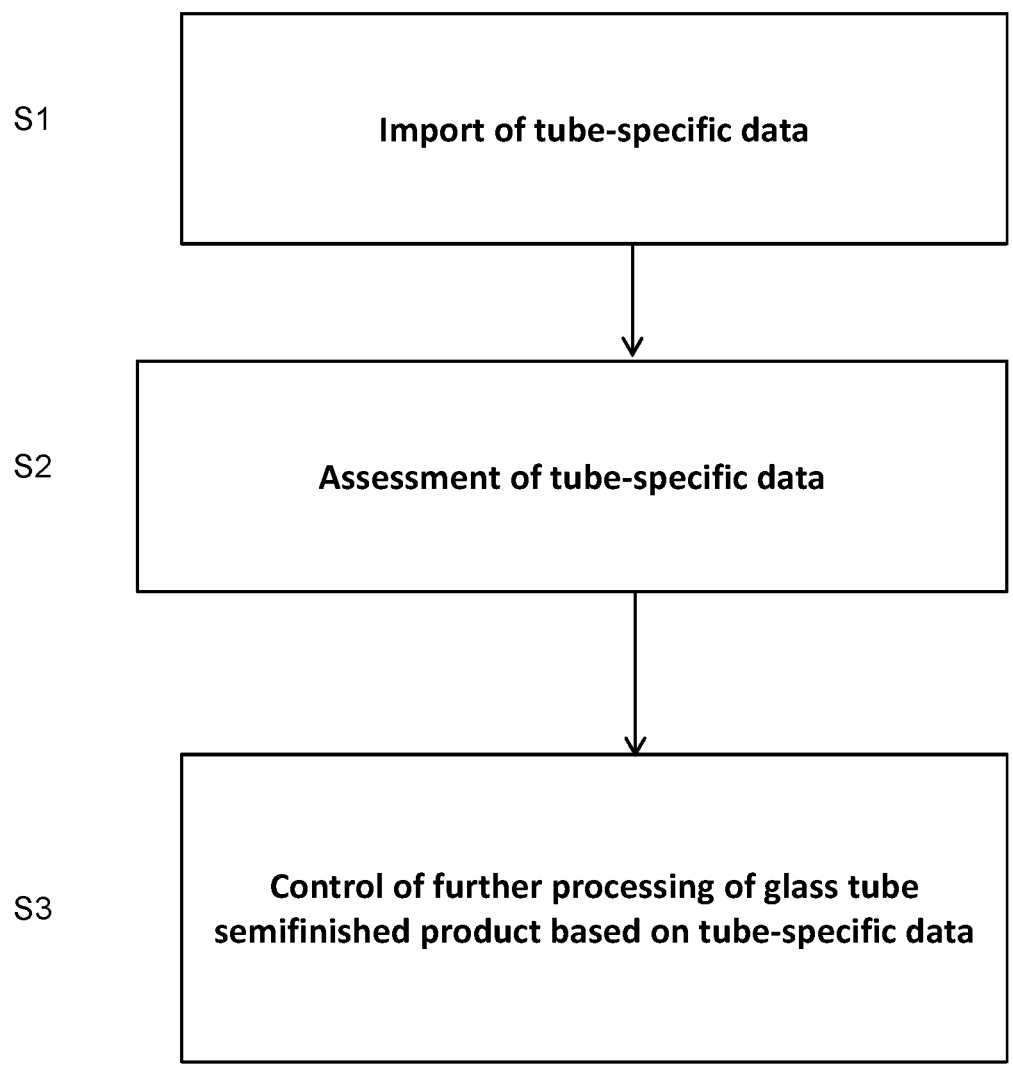
FIG. 3a a schematic flowchart of a first embodiment of a method for further processing a glass tube semi-finished product according to the present invention for producing an end product.

According to FIG. 3a, the tube-specific data for a particular glass tube semi-finished product to be further processed are first read in step S1, for example by accessing an external database 12 (cf. FIG. 2a), by reading a data carrier or a marking which is provided on the glass tube semi-finished product. In step S2, the tube-specific data read is then evaluated, in particular as to whether or not the process parameters currently set for the further processing apparatus will have to be changed for the glass tube semi-finished product currently to be processed. If it is determined in step S2 that the current process parameters of the further processing apparatus are also suitable for the newly processed glass tube semi-finished product or a subsection thereof, the further processing of the glass tube semi-finished product or the subsection thereof to be processed again is carried out with the current process parameters. Otherwise, the process parameters are changed as a function of the tube-specific data (step S3) of the glass tube semi-finished product or the subsection thereof to be processed again. After further processing of the glass tube semi-finished product or of the subsection thereof to be processed again, the method returns to step S1 in order to further process another glass tube semi-finished product or another subsection of the glass tube semi-finished product currently to be processed.

Figure 3B:
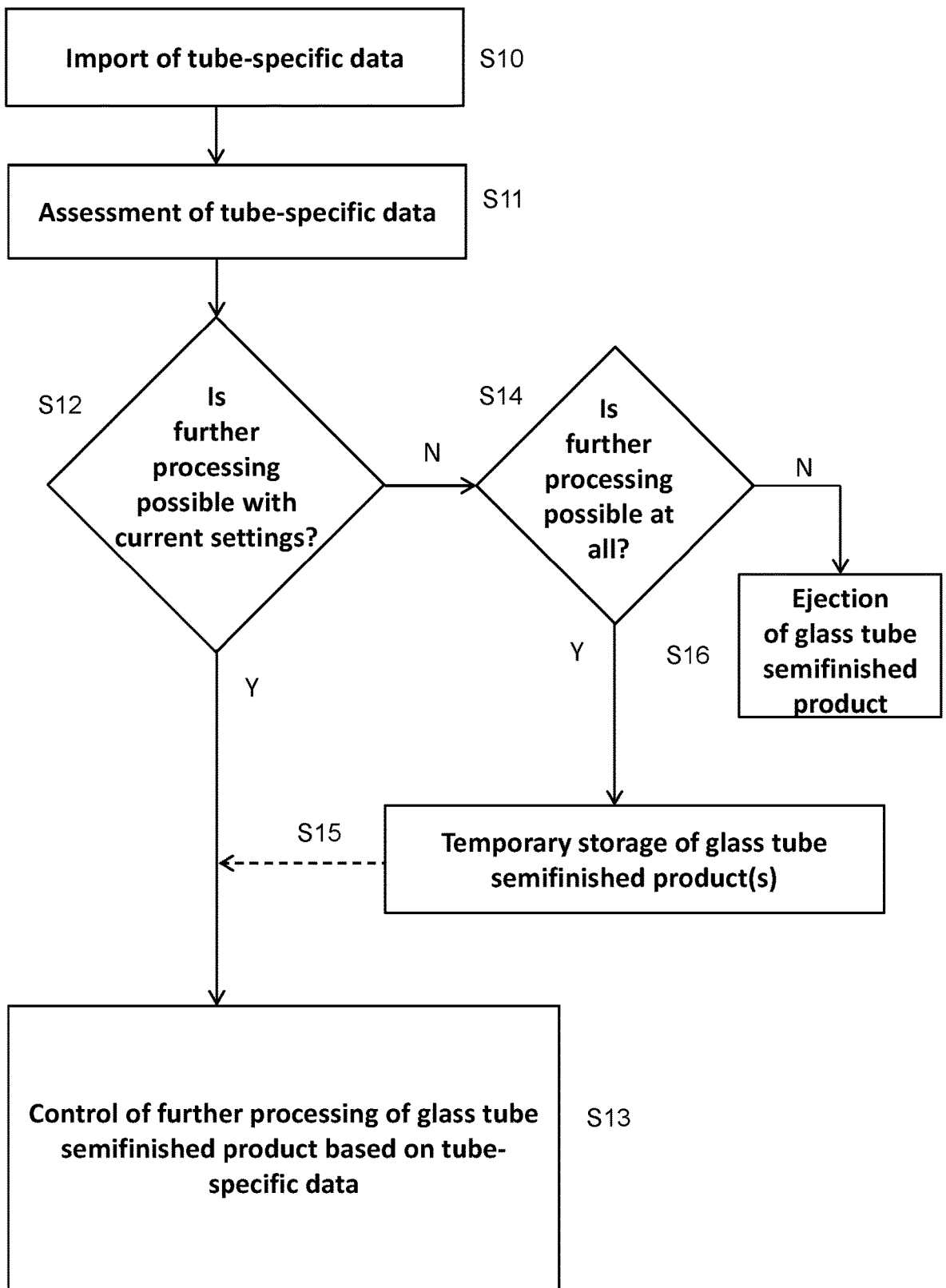
FIG. 3b a schematic flowchart of a second embodiment of a method for further processing a glass tube semi-finished product according to the present invention for producing an end product.

As an alternative to the method according to FIG. 3a, in the method according to FIG. 3b, after step S11 (corresponding to step S2 of FIG. 3a) it is first queried in step S12 whether further processing of the glass tube semi-finished product or of the next subsection thereof to be processed again is possible at all with the current settings of the process parameters. If this is not the case, instead of immediately changing the process parameters, it is first checked in step S14 whether further processing of the glass tube semi-finished product to be processed again or of the next subsection of the glass tube semi-finished product currently to be processed is possible at all, i.e. if the process parameters were to be changed according to the respective tube-specific data. If this is the case, the glass tube semi-finished product to be processed again or the next subsection of the glass tube semi-finished product currently to be processed is temporarily stored in step S15. Otherwise, the glass tube semi-finished product to be processed again or the next subsection to be processed of the glass tube semi-finished product currently to be processed is sorted out in step S16 because it has been determined in step S14 that further processing is not possible at all for the sorted glass tube semi-finished product or the next subsection to be processed.

Subsequently, the method first returns to step S10 and proceeds with a further processing of the next glass tube semi-finished product or of the next subsection of the glass tube semi-finished product currently to be processed (steps S10-S13), unless the next glass tube semi-finished product or the next subsection of the glass tube semi-finished product currently to be processed can also not be further processed (negative decision in step S14 and sorting out in step S16) or the next glass tube semi-finished product or the next subsection of the glass tube semi-finished product currently to be processed is also temporarily stored in step S15.

If a sufficiently large number of glass tube semi-finished products or subsections have been temporarily stored in step S15, after returning to step S10, the method may first suitably set the process parameters for the glass tube semi-finished products or subsections intermediately stored in step S15, and then in step S13 further process these glass tube semi-finished products or subsections with process parameters that correspond to the tube-specific data for these glass tube semi-finished products or subsections. This results in a time saving because the process parameters for further processing do not have to be changed permanently but only in groups, i.e. for the next group of glass tube semi-finished products or subsections which were temporarily stored in step S14.

In particular, step S14 is also suitable for pre-selecting glass tube semi-finished products or subsections into one or more classes of glass tube semi-finished products or subsections, for which the same process parameters have to be used for further processing so that the further processing may also be performed in groups or sequentially for such classes of glass tube semi-finished products or subsections, the process parameters for further processing then only needing to be reset for each new class of glass tube semi-finished products or subsections.

As a requirement for carrying out the method according to the invention, relevant characteristics of the glass tube semi-finished products must be recorded or made available for further processing during tube production. This relates in particular to geometric dimensions of the glass tube semi-finished product, in particular at least one of the following measured variables for the respective glass tube semi-finished product: internal diameter; external diameter; wall thickness; radius of curvature; ovality of the internal diameter; ovality of the external diameter; a variation of at least one of the following measured variables: internal diameter; external diameter; wall thickness; radius of curvature; ovality of the internal diameter; ovality of the external diameter. Furthermore, other information on the quality of the respective glass tube semi-finished product may also be determined during tube production, in particular at least one of the following items of information for the glass tube semi-finished product: composition of a glass melt which was used for tube shaping of the glass tube semi-finished product; homogeneity of the glass melt which was used for tube shaping of the glass tube semi-finished product; process parameters for producing and processing the glass melt which was used for tube shaping of the glass tube semi-finished product; inclusions in a wall of the glass tube semi-finished product, including bubbles, knots, crystalline regions and similar.

These tube-specific data are no longer archived tube-specifically after a good/bad selection of the glass tubes, without a further processing company being able to access these data again later and it then having to repeat the corresponding measurements. Rather, according to the invention, the data arising during tube production with relevant information about the characteristics of a respective glass tube are made available to a further processing company so that individual further processing of the glass tubes can take place based on these tube-specific data and, according to the invention, a re-measurement of the relevant characteristics of the glass tube semi-finished product becomes superfluous. For this purpose, each tube in the manufacturing process receives a coding that contains measurement data either directly or indirectly as a data reference which can be read out to a further processing company and used for the further processing of the glass tubes.

A first application example relates to the use of external diameter measurements for the selection of glass tubes for the production of end products (for example hollow glass products) with close external diameter tolerances and/or internal diameter tolerances, for example a glass tube with a reference external diameter of 10.85 mm and a tolerance of ±0.1 mm. Based on the online measurements which were determined during glass tube production, the glass tubes are marked, e.g. with the information regarding maximum and minimum external diameter. According to the invention, the glass tubes are coded during production in such a way that the geometric data measured during glass tube production are assigned to the glass tube. The assignment can either be done directly by writing the relevant measurements into a glass tube marking, or indirectly by coding each glass tube with a unique serial number and the relevant data for the glass tube being retrieved from a list/database at a further processing company. The indirect method allows substantially more data to be provided.

For the application example, the external diameter curves of glass tubes may be presented, for example, in an upper, middle and lower tolerance range. By reading the measurement data, the glass tubes can then be selected in several classes and later be further treated individually, according to the respective class. The simplest application is, for example, presorting of the glass tubes into external diameter classes and further processing in groups corresponding to these external diameter classes, in each case with process parameters which correspond to the respective external diameter class. The advantage is the significantly more stable processing of the glass tube with standardized settings of the further processing apparatus and minimal user intervention. In this way, closely toleranced end products can be produced without requiring tolerances for the initial glass tube which would mean extreme expenses and high failure for the manufacturer. In particular, compared to the current state of the art, the effort of measuring the tubes in their entire length is eliminated. The data can be read directly, for example, with the help of a simple reader for the code on the tube.

Another possible application is the use of the tube data for controlling tube processing machines. It is state of the art that, for example, in the manufacture of vials, measurements on manufactured vials are used in order to readjust the machine for processing the next vials from this tube. By accessing the tube-specific data determined during glass tube production, a renewed measurement is unnecessary according to the invention since the external diameter measurement values of the glass tube are already present at the beginning of further processing of the glass tube and the system can be controlled in accordance with the current external diameter of the tube.

Likewise, individual tubes with undesirable characteristics could be sorted out, e.g. tubes with a high external diameter gradient.

Advantages for the tube manufacturer are reduction of the product range since few tolerances suffice to serve a wide variety of requirements in further processing.

Application example of incoming goods inspection (at the further processing company):

Instead of checking random samples of glass tubes supplied during the incoming goods inspection at a further processing company for compliance with tolerances, statistical parameters, etc., according to the invention an adjustment between the measurement data of manufacturer and further processing company (=user) can take place at the further processing company on the tube-specific data also provided, i.e. on the basis of concrete measurement data of glass tubes. This adjustment need only take place for a few glass tubes supplied since then the deviations for all the other glass tubes can be calculated accordingly. In this way, the effort for the incoming goods inspection at the further processing company is dramatically reduced and the accuracy of the comparison measurements is significantly increased. Glass tubes have local variations in geometry due to the manufacturing process. These variations make customary direct comparison measurements with a high level of accuracy impossible, since even small deviations in the measuring positions (a few mm) can cause measurement errors of several microns ($\mu m$). To prevent this effect, the measuring position and measured value may be stored in the code of the glass tube to enable exact comparison measurements. This method thus enables the transition from random inspections to one-off inspections as a basis for virtually zero-defect production.

The applications listed for using external diameter data may similarly be adapted for wall thickness and internal diameter data, or even geometric data derived therefrom, such as ovality of the external or internal diameter, wall thickness difference and similar. The same applies to the curvature of a glass tube. In addition, data on the glass quality of the glass tube itself (e.g. bubbles, knots, crystals, etc.) can be stored in the code in a similar manner and used for individual further processing of the glass tubes according to the glass quality.

While it has always been described above that the tube-specific data are read out from a marking which is connected to the respective glass tube semi-finished product or which is directly applied to the respective glass tube semi-finished product (e. g. printed or glued on) or which is directly inserted into it (e. g. inscribed), in the following another example of a process for further processing a glass tube semi-finished product according to the present invention for the manufacture of a final product will be described with reference to FIG. 4, in which the tube-specific information is determined on the basis of a position in a stack of glass tubes which is assigned to the tube-specific data by means of an unambiguous mapping rule.

Figure 4:
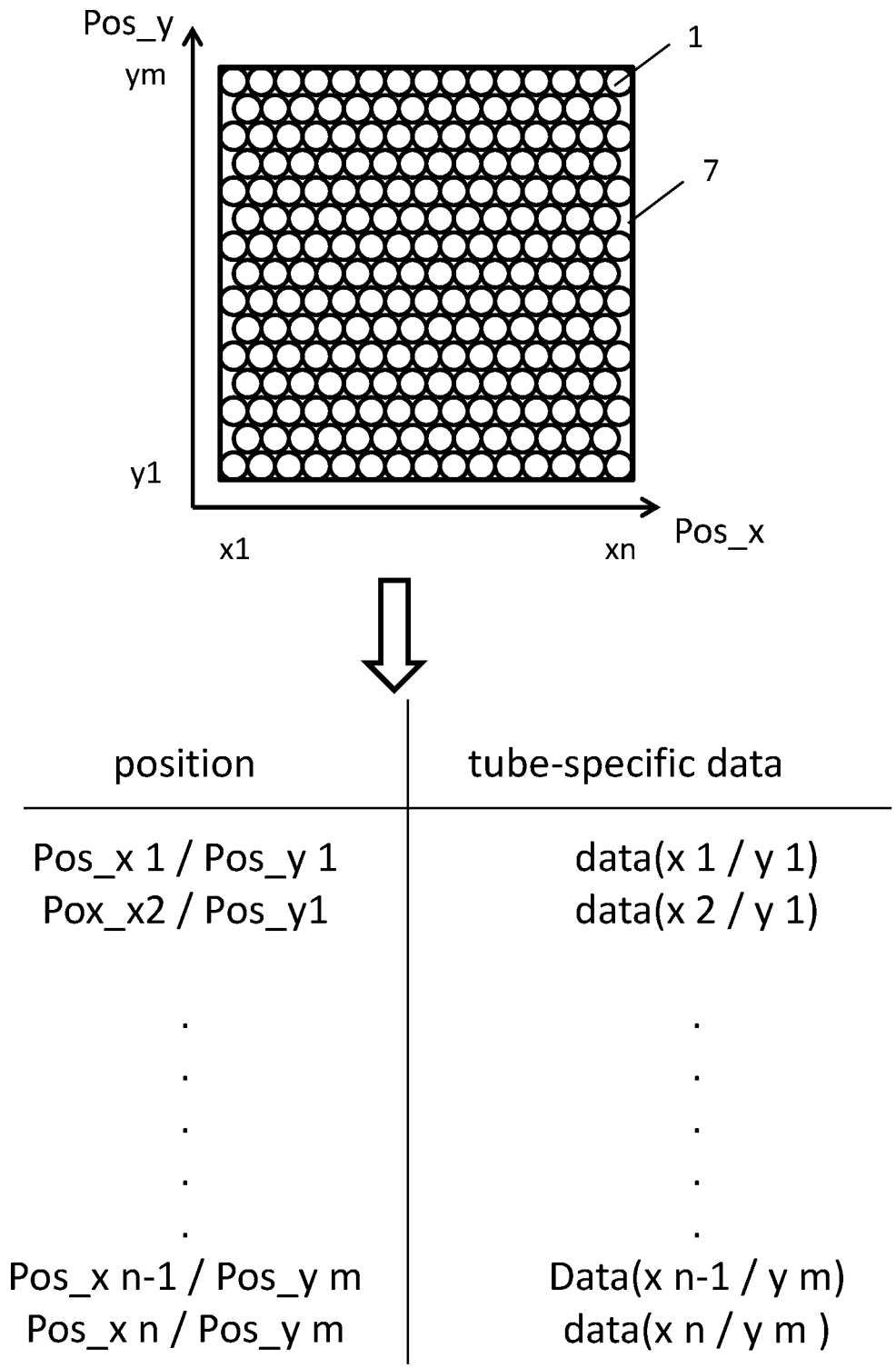
FIG. 4 a further embodiment of a method for further processing a glass tube semi-finished product according to the present invention for producing an end product.

The embodiment of FIG. 4 is based on the assumption that glass tube semi-finished products are usually supplied to further processing companies in the form of packaging units having a rectangular cross section, each consisting of a plurality of glass tube semi-finished products. More specifically, the stack shown in the upper part of FIG. 4 consists of a plurality of glass tube semi-finished products, the number of which in a first direction (x-direction) is xn and the number in a second direction (y-direction) perpendicular to the first direction is ym, wherein the layers of glass tube semi-finished products are stacked offset by half a glass tube diameter relative to one another. For example, such packaging units consist of one hundred semi-finished glass tube products of the same length. The orientation of such packaging units is clearly defined by a marking on the top of the packaging units. Due to this clearly defined orientation, each glass tube semi-finished product can be assigned a unique position in the packaging unit. For example, the glass tube semi-finished products in the lowest layer in FIG. 4 are characterized, from left to right, by coordinate like positions Pos_x1/Pos_y1 to Pos_xn/Pos_y1, to which corresponding tube-specific data sets data(x1/y1) to data(xn/y1) are assigned. And the glass tube semi-finished products in the top layer in FIG. 4 are characterized, from left to right, by coordinate like positions Pos_x1/Pos_ym to Pos_xn/Posym, to which corresponding tube specific datasets data(x1/ym) to data(xn/ym) are assigned. Knowing the position of a glass tube semi-finished product in the packaging unit, the tube-specific data can be read in by accessing a database, a data carrier or an associated data sheet in order to control at least one process parameter during further processing of the respective glass tube semi-finished product depending on the tube-specific data determined in this way for the respective glass tube semi-finished product. Of course, the above-mentioned assignment of the positions of the glass tube semi-finished products in the packaging unit may also be specified in any other way according to a mapping rule, which may also include a random assignment of the positions of the glass tube semi-finished products, as long as the mapping rule is made available to the parties involved.

The method according to the present invention is generally suitable for the further processing of glass tubes for the production of any closely toleranced end products. A preferred example of such end products are containers for substances for pharmaceutical, medicinal or even cosmetic applications, for example vials, cartridges or syringe bodies.

In principle, however, the method according to the invention is also suitable for any other methods for the further processing of glass tubes including a step of thermal forming carried out at least in sections, for example widening or reducing of an external and/or internal diameter of a glass tube, stretching of a glass tube, changing the external and/or internal profile of a glass tube, in each case including a step of thermal forming carried out at least in sections, especially at temperatures above a transformation temperature of the glass.

LIST OF REFERENCE NUMBERS 1 glass tube or glass tube semi-finished product
2 tube strand marking
3 tube marking
4 tube identification information
5 additional tube data
7 packaging unit
10 measuring device/measuring and marking device
11 control device (on the site of glass tube manufacturer)
12 database
15 readout device
16 control device (at downstream further processing company)
17 network
20 apparatus for further processing
21 subunit 1 of apparatus for further processing 20
22 subunit 2 of apparatus for further processing 20
23 subunit 3 of apparatus for further processing 20
24 subunit 4 of apparatus for further processing 20
30 tube-specific data for tube-ID1
31 tube-specific data for tube-ID2
1 predetermined distance
Z longitudinal direction

What is claimed is:

1. A method for further processing a plurality of glass tube semi-finished products, comprising:
providing the plurality of glass tube semi-finished products, wherein tube-specific data are provided at least one of on a data storage device and in a database for each glass tube semi-finished product of the plurality of glass tube semi-finished products, and wherein each glass tube semi-finished product is marked with at least one marking associated with the tube-specific data of the respective glass tube semi-finished product;
reading out the tube-specific data for the respective glass tube semi-finished product based on the at least one marking associated with the tube-specific data; and
further processing the plurality of glass tube semi-finished products, the further processing including thermal forming carried out at least in sections, wherein at least one process parameter during the further processing of the respective glass tube semi-finished product of the plurality of glass tube semi-finished products is controlled as a function of the tube-specific data for the respective glass tube semi-finished product;
wherein the at least one marking includes tube identification information, based on which the tube-specific data for the glass tube semi-finished product are read out of the data storage device or the database.

2. The method according to claim 1, wherein the tube-specific data are provided in each case for subsections of the glass tube semi-finished product of a predetermined length in a longitudinal direction of the glass tube semi-finished product.

3. The method according to claim 1, wherein the tube-specific data are provided for a particular glass tube semi-finished product averaged over a plurality of subsections of the glass tube semi-finished product in a longitudinal direction of the glass tube semi-finished product.

4. The method according to claim 3, wherein the glass tube semi-finished product is classified into one of a plurality of classes according to the averaged tube-specific data.

5. The method according to claim 1, wherein the tube-specific data relate to at least one geometric dimension of the glass tube semi-finished product and include at least one of the following measured variables for the glass tube semi-finished product:
internal diameter, external diameter, wall thickness, radius of curvature, ovality of the internal diameter, ovality of the external diameter, a variation of the internal diameter, a variation of the external diameter, a variation of the wall thickness, a variation of the radius of curvature, a variation of the ovality of the internal diameter, and a variation of the ovality of the external diameter.

6. A method for further processing a plurality of glass tube semi-finished products, comprising:
providing the plurality of glass tube semi-finished products, wherein tube-specific data are provided at least one of on a data storage device, in a database and on each glass tube semi-finished product for each glass tube semi-finished product of the plurality of glass tube semi-finished products, and wherein each glass tube semi-finished product is marked with at least one marking associated with the tube-specific data of the respective glass tube semi-finished product;
reading out the tube-specific data for the respective glass tube semi-finished product based on the at least one marking associated with the tube-specific data; and
further processing the plurality of glass tube semi-finished products, the further processing including thermal forming carried out at least in sections, wherein at least one process parameter during the further processing of the respective glass tube semi-finished product of the plurality of glass tube semi-finished products is controlled as a function of the tube-specific data for the respective glass tube semi-finished product;
wherein the tube-specific data comprise at least one of homogeneity of a glass melt which was used for tube shaping of the glass tube semi-finished product and process parameters for producing and processing the glass melt which was used for tube shaping of the glass tube semi-finished product.

7. The method according to claim 6, wherein the tube-specific data for the glass tube semi-finished product are included one of (i) in further markings on the glass tube semi-finished product distinct from the at least one marking associated with the tube-specific data, or (ii) in at least one marking section of the at least one marking associated with the tube-specific data on the glass tube semi-finished product.

8. The method according to claim 1, wherein the at least one marking is applied by one of the following methods:
application of a bar code or matrix code marking which codes the tube-specific data or a data link to the tube-specific data; sticking on an adhesive label which codes the tube-specific data or a data link to the tube-specific data; attachment of a radio frequency identification (RFID) tag to the glass tube semi-finished product which codes the tube-specific data or a data link to the tube-specific data.

9. The method according to claim 1, wherein the at least one marking is produced by interaction of a laser beam with the glass of the glass tube semi-finished product.

10. The method according to claim 9, wherein the at least one marking is generated in a wall of the glass tube semi-finished product by interaction of the laser beam with the glass of the glass tube semi-finished product at temperatures above the transformation temperature of the glass, as a digital matrix code (DMC).

11. The method according to claim 8, wherein the at least one marking is read out optically and contact-free in order to read out the tube-specific data of the glass tube semi-finished product.

12. The method according to claim 1, wherein:
at least one glass tube semi-finished product is measured and assessed before the further processing,
measured variables and assessment data are compared with the tube-specific data for the at least one glass tube semi-finished product in order to determine variance information, and
the at least one process parameter, which is used during the further processing of the plurality of glass tube semi-finished products, is controlled as a function of the tube-specific data for the at least one glass tube semi-finished product taking into account the variance information determined.

13. The method according to claim 1, wherein the further processing of the glass tube semi-finished product includes a local heating of a section of the glass tube semi-finished product and a separation of a container by separating from the glass tube semi-finished product in the region of the locally heated section to form a base of the container.

14. The method according to claim 13, wherein a neck of the container is preformed during separation of the container from the glass tube semi-finished product, the container is held with the neck facing down by a holding device, and the base of the container positioned above the neck is formed gradually from the glass tube semi-finished product by collapsing a wall of the glass tube.

15. The method according to claim 14, further comprising further processing of the base of the container with at least one of the following steps:
processing of the base of the container with at least one burner in order to roughly shape the base;
further processing of the base with at least one burner in order to shape the base flat;
pressing of the base into a mold die by applying a gas pressure in order to finally shape the base; and
cooling of the base.

16. The method according to claim 13, wherein the further processing of the glass tube semi-finished product further comprises:
one of sorting or storage of the glass tube semi-finished product if, based on the tube-specific data for the glass tube semi-finished product, it is determined that the further processing of the glass tube semi-finished product is not possible with current process parameters.

17. The method according to claim 16, wherein the glass tube semi-finished product is further processed after storage, with changed process parameters which are determined based on the tube-specific data for the glass tube semi-finished product.

18. The method according to claim 13, wherein the container is a container for holding one of pharmaceutical, medicinal or cosmetic substances, the container being configured as one of a vial, a cartridge or a syringe body.

* * * * *